(12) United States Patent
Gupta et al.

(10) Patent No.: US 9,388,044 B2
(45) Date of Patent: *Jul. 12, 2016

(54) METHODS FOR THE ON-SITE PRODUCTION OF CHLORAMINE AND USES THEREOF

(75) Inventors: Amit Gupta, Aurora, IL (US); Laura E. Rice, Saint Charles, IL (US); Randall Elliott, Naperville, IL (US); Yu-Mei Lu, Taipei (TW); Wen Li Tu, Shanghai (CN)

(73) Assignee: NALCO COMPANY, Naperville, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 13/249,972

(22) Filed: Sep. 30, 2011

(65) Prior Publication Data
US 2012/0021062 A1    Jan. 26, 2012

Related U.S. Application Data

(63) Continuation-in-part of application No. 12/546,086, filed on Aug. 24, 2009, which is a continuation-in-part of application No. 11/618,227, filed on Dec. 29, 2006, now abandoned.

(51) Int. Cl.
| | |
|---|---|
| *C02F 1/50* | (2006.01) |
| *C01B 21/09* | (2006.01) |
| *C02F 1/76* | (2006.01) |

(52) U.S. Cl.
CPC ............ *C01B 21/091* (2013.01); *C02F 1/50* (2013.01); *C02F 1/766* (2013.01); *C02F 2209/06* (2013.01); *C02F 2209/29* (2013.01); *C02F 2303/04* (2013.01); *C02F 2303/20* (2013.01); *Y02W 10/37* (2015.05)

(58) Field of Classification Search
USPC .......... 423/351, 383, 413, 463, 470; 210/753, 210/754, 756
See application file for complete search history.

(56) References Cited

U.S. PATENT DOCUMENTS

| | | | |
|---|---|---|---|
| 2,155,914 A * | 4/1939 | van der Lee ............ 252/187.33 |
| 3,254,952 A | 6/1966 | Raleigh et al. |
| 4,038,372 A * | 7/1977 | Colli ............................ 423/413 |
| 5,976,386 A | 11/1999 | Barak |
| 6,132,628 A | 10/2000 | Barak |
| 6,222,071 B1 | 4/2001 | Delalu et al. |
| 6,964,788 B2 | 11/2005 | Phebus et al. |
| 7,045,659 B2 * | 5/2006 | Delalu et al. ................. 564/118 |
| 7,067,063 B2 | 6/2006 | Barak |

(Continued)

FOREIGN PATENT DOCUMENTS

WO    2009155462 A1    12/2009

*Primary Examiner* — Melissa Swain
(74) *Attorney, Agent, or Firm* — Eric D. Babych; Brinks Gilson & Lione

(57) ABSTRACT

A method of producing stable disinfectant for use as a biocidal composition. The method comprises: providing reagents, asynchronously feeding the reagents into a wide space, and allowing all the reagents to come into contact and mix with each other. The reagents comprise: a) an amine source in concentrated form, b) an oxidizing halogen compound in concentrated form, and c) a diluent. The use of asynchronous feeding and a wide space results in a dynamic biocide regimen. This regimen results in a changing environment that infestations have difficulty adapting to. This method also imparts superior results due to the avoidance of channeling effects which would otherwise weaken the effects of the biocide.

11 Claims, 19 Drawing Sheets

(56) References Cited

U.S. PATENT DOCUMENTS

| | | | |
|---|---|---|---|
| 7,070,751 B2* | 7/2006 | Tummala et al. | 423/413 |
| 7,285,224 B2 | 10/2007 | Barak | |
| 2002/0125196 A1 | 9/2002 | Rosenblatt et al. | |
| 2003/0232447 A1* | 12/2003 | Kahle | 436/113 |
| 2004/0086577 A1* | 5/2004 | Delalu et al. | 424/661 |
| 2004/0141905 A1* | 7/2004 | Tummala et al. | 423/413 |
| 2007/0049642 A1 | 3/2007 | Singleton et al. | |
| 2007/0123423 A1 | 5/2007 | Cheng | |
| 2007/0183957 A1* | 8/2007 | Warr et al. | 423/413 |
| 2008/0093308 A1 | 4/2008 | Kouame et al. | |
| 2008/0156740 A1 | 7/2008 | Gupta et al. | |
| 2008/0160104 A1* | 7/2008 | Ramesh et al. | 424/661 |
| 2008/0160604 A1* | 7/2008 | Gupta et al. | 435/289.1 |
| 2009/0117202 A1 | 5/2009 | Feldman et al. | |
| 2009/0173697 A1 | 7/2009 | Axtell et al. | |
| 2009/0311164 A1 | 12/2009 | Gupta et al. | |
| 2009/0320570 A1* | 12/2009 | Wiese | 73/61.43 |
| 2010/0078393 A1 | 4/2010 | Yin | |
| 2011/0159117 A1 | 6/2011 | Mayer et al. | |

\* cited by examiner

METHODS FOR THE ON-SITE PRODUCTION OF CHLORAMINE AND USES THEREOF

CROSS-REFERENCE TO RELATED APPLICATIONS

This application is a Continuation-In Part of currently pending U.S. patent application Ser. No. 12/546,086 which was filed on Aug. 24, 2009 and which itself is a Continuation-In Part of now abandoned U.S. patent application Ser. No. 11/618,227 filed on Dec. 29, 2006.

STATEMENT REGARDING FEDERALLY SPONSORED RESEARCH OR DEVELOPMENT

Not Applicable.

BACKGROUND OF THE INVENTION

This invention relates to methods and compositions for producing stable disinfectants (such as chloramine) for use as a biocidal composition. Industrial water systems are subject to various sorts of fouling. Fouling can occur in the form of mineral fouling, biological fouling, and often combinations of the two. In fact mineral fouling often provides an anchor and substrate for biological infestations, and some organisms leach or secrete minerals onto industrial water system surfaces.

Fouling may occurs as a result of a variety of mechanisms including deposition of air-borne and water-borne and water-formed contaminants, water stagnation, process leaks, and other factors. If allowed to progress, fouling can cause a system to suffer from decreased operational efficiency, premature equipment failure, loss in productivity, loss in product quality, and (in particular in the case of microbial fouling) increased health-related risks.

Biological fouling results from rapidly spreading microbial communities that develop on any wetted or semi-wetted surface of the water system. Once these microorganisms are present in the bulk water they will form of biofilms on the system's solid surfaces.

Exopolymeric substance secreted from the microorganisms aid in the formation of biofilms as the microbial communities develop. These biofilms are complex ecosystems that establish a means for concentrating nutrients and offer protection for growth. Biofilms can accelerate scale, corrosion, and other fouling processes. Not only do biofilms contribute to reduction of system efficiencies, but they also provide an excellent environment for microbial proliferation that can include pathogenic bacteria. It is therefore important that biofilms and other fouling processes be reduced to the greatest extent possible to maximize process efficiency and minimize the health-related risks from water-borne pathogens.

Several factors contribute to the problem of biological fouling and govern its extent. Water temperature; water pH; organic and inorganic nutrients, growth conditions such as aerobic or anaerobic conditions, and in some cases the presence or absence of sunlight, etc., can play an important role. These factors also help in deciding what types of microorganisms might be present in the water system.

Many different Prior Art approaches have been attempted to control biological fouling of industrial processes. The most commonly used method is the application of biocidal compounds to the process waters. The biocides applied may be oxidizing or non-oxidizing in nature. Due to several different factors such as economics and environmental concerns, the oxidizing biocides are preferred. Oxidizing biocides such as chlorine gas, hypochlorous acid, bromine derived biocides, and other oxidizing biocides are widely used in the treatment of industrial water systems.

One factor in establishing the efficacy of oxidizing biocides is the presence of components within the water matrix that would constitute a chlorine demand or oxidizing biocide demand. Chlorine-consuming substances include, but are not limited to, microorganisms, organic molecules, ammonia and amino derivatives; sulfides, cyanides, oxidizable cations, pulp lignins, starch, sugars, oil, water treatment additives like scale and corrosion inhibitors, etc. Microbial growth in die water and in biofilms contributes to the chlorine demand of the water and to the chlorine demand of the system to be treated. Conventional oxidizing biocides were found to be ineffective in waters containing a high chlorine demand, including heavy slimes. Non-oxidizing biocides are usually recommended for such waters.

As described in U.S. patent application Ser. Nos. 12/546,086 and 11/618,227, Chloramines are effective and are typically used in conditions where a high demand for oxidizing biocides such as chlorine exists or under conditions that benefit from the persistence of an oxidizing biocide. Domestic water systems are increasingly being treated with chloramines. Chloramines are generally formed when free chlorine reacts with ammonia present or added to the waters. Many different methods for production of chloramines have been documented. Certain key parameters of the reaction between the chlorine and the nitrogen source determine the stability and efficacy of the produced biocidal compound.

Prior Art methods of producing chloramines have been described for example in U.S. Pat. Nos. 7,285,224, 6,132,628, 5,976386, 7,067,063, and 3,254,952 and US Published Patent Application and 2007/0123423. The Prior Art methods generally rely on the combination of an ammonium stabilizer component and a sodium hypochlorite component in a dilute or concentrated form to produce a solution of chloramines followed by immediate introduction into the water system being treated. Also typically the combination of the chemical components is conducted in a continuous and synchronous fashion in a conduit. To achieve this the components are either added to separate diluent (such as water) streams followed by the combination of the different streams containing the diluted components or the components are added simultaneously to the same stream at different locations, or the concentrated from of the components are combined. The components comprise a nitrogen source typically in the form of a ammonium salt (such as a sulfate, bromide, or chloride) and a chlorine or Bromine donor in the form of gas or combined with alkali earth metal (such as sodium, potassium, or calcium). Also the prior art methods have relied upon controlling the pH of the mixed solution by addition of a component at a high pH or by the separate addition of a caustic solution.

The limitations of these Prior Art methods have imposed a number of drawbacks on their use. Most limiting is the fact that the produced chloramine must be immediately used and cannot be stored for future use because it is subject to rapid degradation. The chloramine also must be generated outside of the system being treated and must be rapidly piped in to the system. As a result various economic, efficiency, and process, constraints limit the use and practicality of these Prior Art methods. Thus there is clear need and utility for a methods and compositions useful in improving the production and use of stable chloramine for use as a biocidal composition.

The art described in this section is not intended to constitute an admission that any patent, publication or other information referred to herein is "Prior Art" with respect to this invention, unless specifically designated as such. In addition, this section should not be construed to mean that a search has been made or that no other pertinent information as defined in 37 CFR §1.56(a) exists.

BRIEF SUMMARY OF THE INVENTION

At least one embodiment of the invention is directed to a method of producing stable disinfectant for use as a biocidal composition. The method comprises: A) providing reagents, B) asynchronously feeding the at least two of the reagents into a wide space, and C) allowing all the reagents to come into contact and mix with each other. The reagents comprise: a) an amine source of disinfectant in concentrated form, b) an oxidizing halogen compound in concentrated form, and c) a diluent.

The amine source may be chloramine. The diluent may comprise enough caustic to reduce the pH of the combination of reagents to no more than 12.5. The concentration of the disinfectant in concentrated form may be in the range from 5%-80% and after it is mixed with the diluent it drops to 0.01%-5%. The concentration of the oxidizing halogen compound in concentrated form may be within the range of 3%-18% and after it is mixed with the diluent it drops to 0.01%-3%. The molar ratio of chloramine to oxidizing halogen may be within the range of 0:1:1 to 10:1. The oxidizing halogen may be a chlorine source and may be sodium hypochlorite. The disinfectant may be produced according to a batch process, a continuous dose process, a slug dose process and any combination thereof.

Additional features and advantages are described herein, and will be apparent from, the following Detailed Description.

BRIEF DESCRIPTION OF THE DRAWINGS

A detailed description of the invention is hereafter described with specific reference being made to the drawings in which.

DETAILED DESCRIPTION OF THE INVENTION

Figure 1:
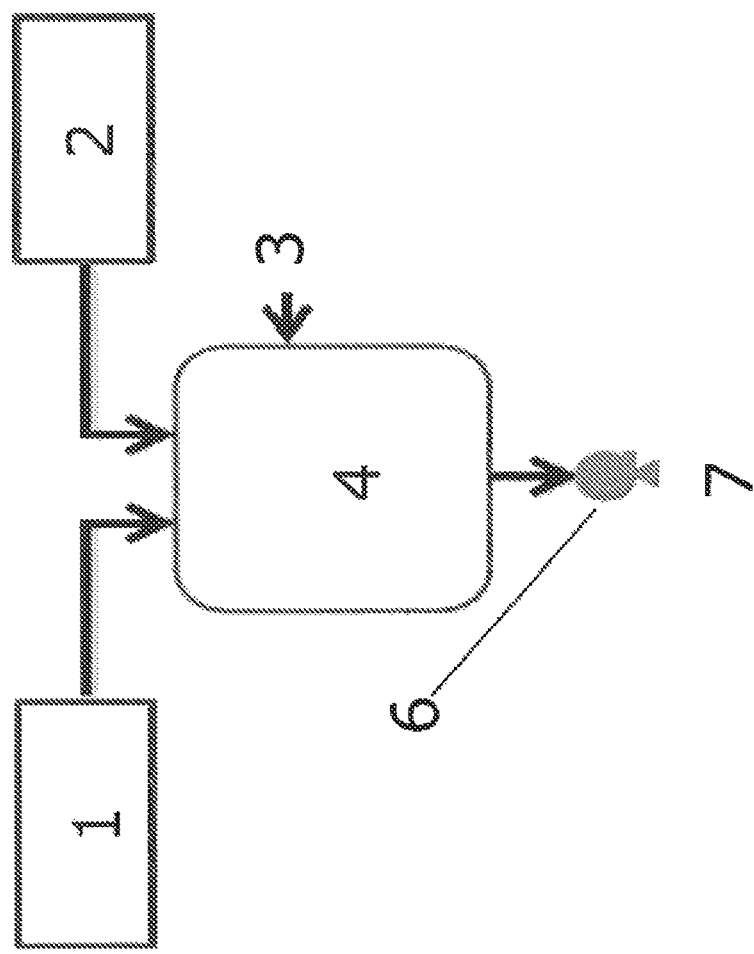
FIG. 1 is a drawing of a separate addition method of producing chloramine using a wide space in the blending lines or a batch method.

The following definitions are provided to determine how terms used in this application, and in particular how the claims, are to be construed. The organization of the definitions is for convenience only and is not intended to limit any of the definitions to any particular category.

"Amine Source" means any inorganic or organic compound comprising an ammonium ion and/or moiety which can be oxidized and/or halogenated by an oxidizing halogen.

"Asynchronous Mixing" means mixing such that over a discrete period of time the amount or concentration of a material mixed and then fed into a system fluctuates. Asynchronous Mixing of biocides is more likely to result in the particular formulation ideal for killing the particular organism present happening to result and it also creates a dynamic environment which makes it difficult for organisms to adapt to.

"Batch Process" means chemical process in which only a finite number of reagents can be fed into a reaction operation over a period of time having a discrete start time and end time and which produces a finite amount of product.

"Channeling" means a process in which mixture of materials flowing through a line separates into different flowing layers sorted by density, viscosity, temperature or some other property. Channeling can be prevented by use of a wide space in the mixing line.

"Chlorine demand" means the quantity of chlorine that is reduced or otherwise transformed to inert forms of chlorine by substances in the water; standard methods have been established for measuring it. In this specification and claims "chlorine demand" includes the properties innate to the results of measurements and procedures outlined in "Standard Methods for the examination of water and waste water,", 16th edition, Methods §409, pages 316-319. The methods are based on applying a specific dose of chlorine to the medium and measuring the residual chlorine left after a given contact time. Chlorine-consuming substances include ammonia and amino derivatives; sulfides, cyanides, oxidizable cations, pulp lignins, starch, sugars, oil, water treatment additives like scale, and corrosion inhibitors.

"Concentrated" means the materials are used as delivered, without the addition of a diluent. Where sodium hypochlorite is used, the concentration will range from 3-18% as total available chlorine. The concentration of the amine solutions may range from 5-80%.

"Continuous Process" means an ongoing chemical process, which is capable of theoretically continuing over an unlimited period of time in which reagents can be continuously fed into a reaction operation to continuously produce product. Continuous Process and Batch Process are mutually exclusive.

"Fouling" means the unwanted deposition of organic or inorganic material on a surface.

"Oxidizing Halogen" means a halogen bearing composition of matter including but not limited to chlorine, bromine or iodine derivatives, most preferably a chlorine or bromine derivative such as hypochlorous acid or hypobromous acid, wherein the composition is capable of oxidizing an amine source.

"Wide Space" means an area in the mixing line where the diameter of the line is larger than the largest individual reagent supply line leading into it and in which the transition from the smaller to larger diameter is not streamlined, whereby when a liquid flows into this area the change in diameter results in eddies which mix the fed materials in an erratic manner and prevents channeling. This wide space allows for adequate mixing, functioning differently than a standard conduit. The wide space could be an isolated batch tank.

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the *Kirk-Othmer Encyclopedia of Chemical Technology,* 5th Edition, (2005), (Published by Wiley, Sohn & Sons, Inc.) this definition shall control how the term is to be defined in the claims.

In at least one embodiment chloramine is generated by a process in which the chemical reagents are introduced into a wide space for the production of chloramine. In at least one embodiment one or more of the reagents are introduced either automatically via a controller device, such as a PLC device or a timer, or manually. Any number of measurements can be used to regulate the flow of reagents, including but not limited to tank volume, ORP, residual chlorine, pH, temperature, and microbial activity. The wide space can take the shape of a plumbed wide zone in a conduit that is then connected to the process being treated or can be a separate container, for example a tank. A diluent which is any appropriate liquid including but not limited to water is also streamed into the wide space.

In FIGS. 1-19 there are shown a number of arrangements for an apparatus used in the inventive method. These apparatuses involve the feeding of at least three items into the wide space (4). Feed item A (1) is a concentrated or a diluted chlorine source, typically sodium hypochlorite. Feed item B (2) is a concentrated or a diluted stabilizer composition which is a nitrogen hearing composition. The nitrogen hearing portion can be an organic material or an ammonium salt. The salt form can be a result of the nitrogen bearing item being in the form of a sulfate, bromide or chloride. The nitrogen bearing material can also include ammonium sulfamate. At some point Feed hem A (1), Feed item B (2), come into contact with a diluent (3). In at least one embodiment the diluent comprises water. In at least one embodiment the diluent comprises enough caustic to maintain the pH of the combination of Feed items A and B (1, 2) to no more than 12.5. Other means of caustic addition include adding caustic to the halogen and/or stabilizer solution to maintain the pH of the combination of Feed items A and B (1, 2) to no more than 12.5.

Referring now to FIG. 1 there is shown a method in which Feed items A and B (1, 2) are added as concentrates or as diluted products. Additional diluent (3) may or may not be added or the products may be batch diluted on-site. The setup optional mixer to aid mixing of the different components. The chloramine as produced in the tank is then introduced into the process water system (7) needing to be treated. The introduction may be by way of a pump (6). The chloramine is produced in the wide space (4) and is then introduced into the process water system needing to be treated.

Figure 2:
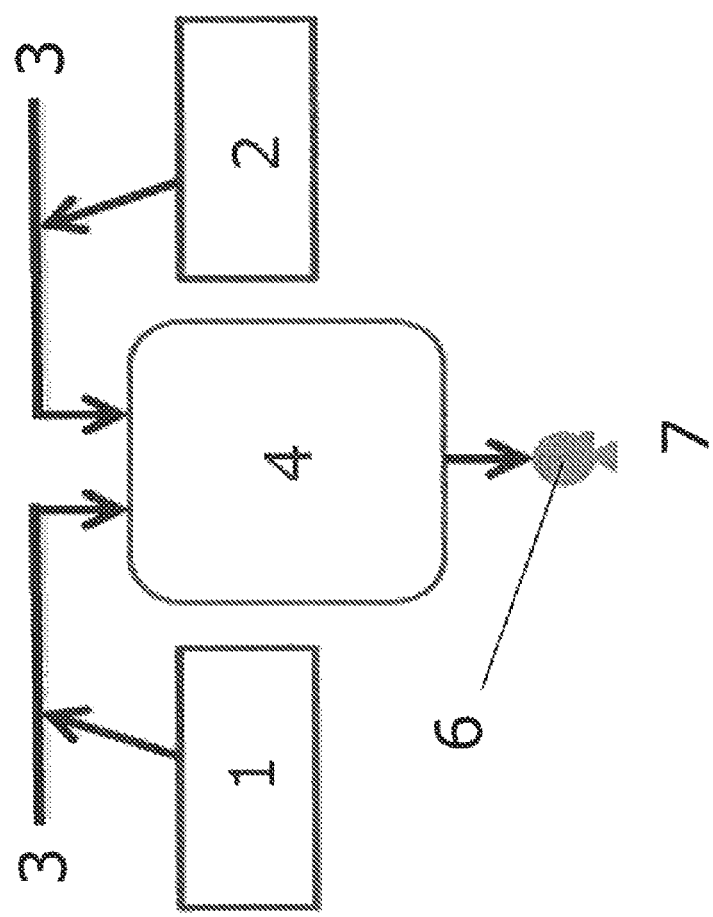
FIG. 2 is a drawing of a continuous dilution method of producing chloramine using a wide space in the blending lines or a batch method.

Referring now to FIG. 2 there is shown a method in which Feed items A and B (1, 2) are diluted continuously as they are introduced into the wide space (4). Feed Items A and B (1, 2) and diluent (3) may be blended in any order. In at least one embodiment not all components are diluted. The setup may contain an optional in-line or static mixer to aid mixing of one or more chemical components and the diluent. Also, the setup may include a mixer in the tank to aid in the blending of the different solutions. The chloramine as produced in the tank is then introduced into the process water system requiring treatment.

Figure 3:
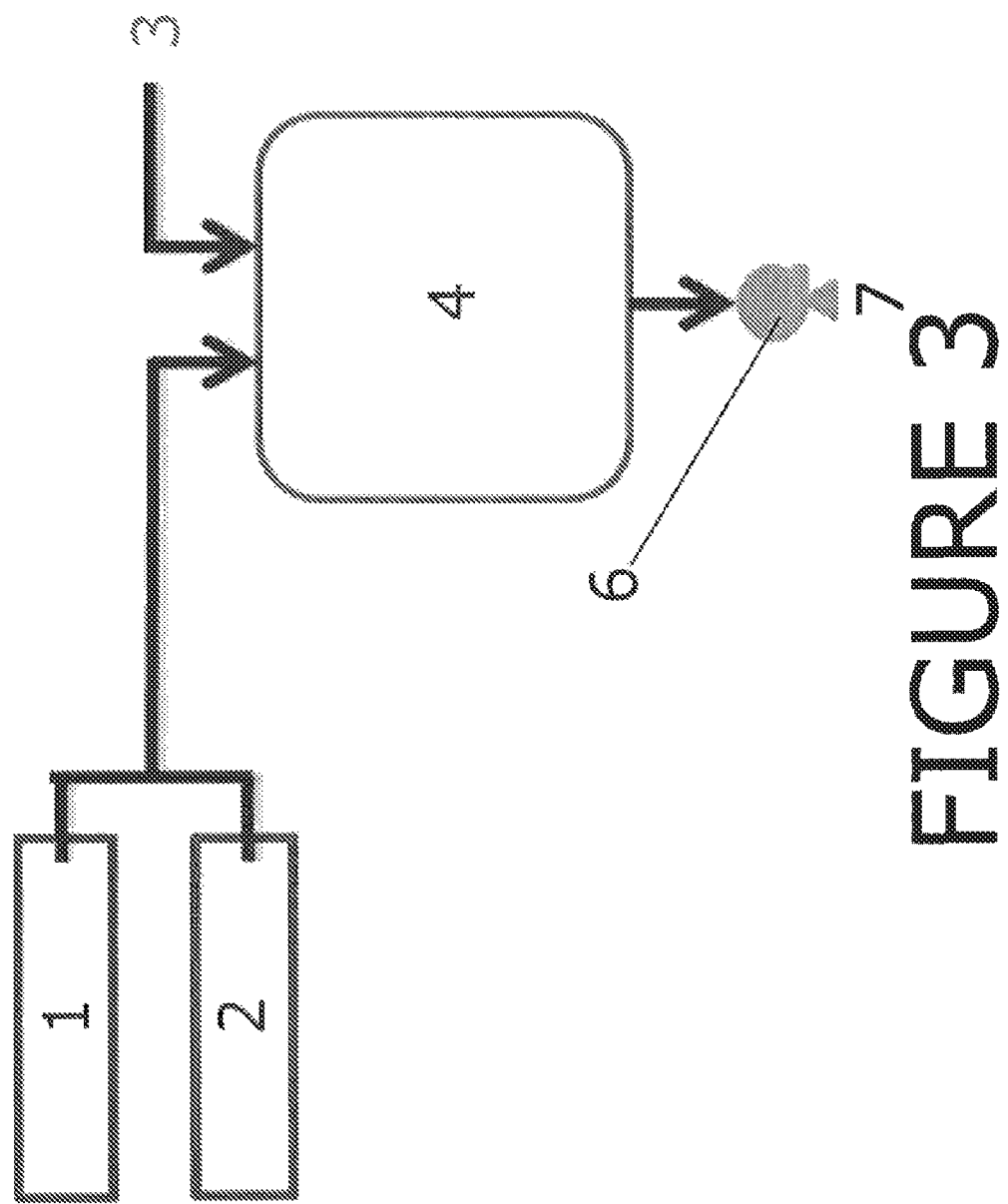
FIG. 3 is a drawing of a prior mixing method of producing dilute chloramine using a wide space in the blending lines or a batch method.

Referring now to FIG. 3 there is shown a method in which Feed Items A and B (1, 2) are either concentrates or diluted and are mixed with each other prior to being introduced into the tank. The setup may contain an optional in-line mixer to aid mixing of the chloramine and the diluent. Also, the setup may include a mixer in the tank to aid in the blending of the different solutions. The diluent can optionally be introduced into the tank in a separate stream.

Figure 4:
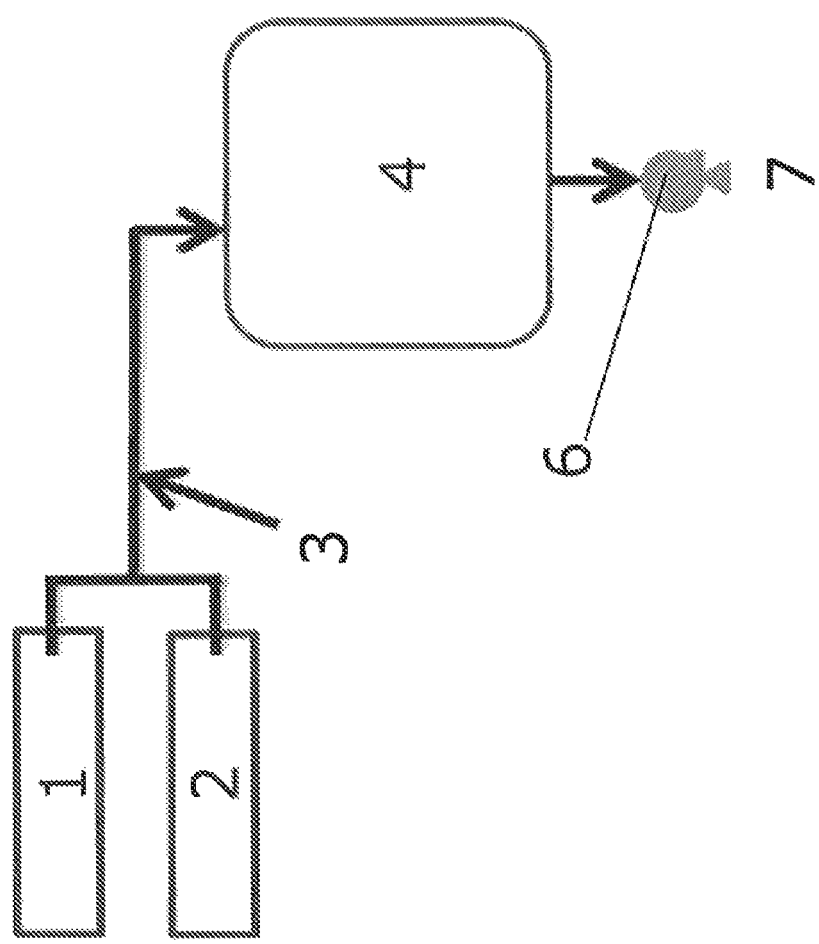
FIG. 4 is a drawing of a prior mixing and subsequent dilution method of producing chloramine using a wide space in the blending lines or a batch method.

Referring now to FIG. 4 there is shown a method in which Feed Items A and B (1, 2) can be mixed prior to entering the tank followed by the addition of the diluent to the conduit before entering the wide space (4). Feed Items A and B (1, 2) may be concentrates or diluted prior to blending. The setup may contain an optional in-line mixer to aid in the blending of the chloramine and the diluent. Also, the setup may include a mixer in the tank to aid in efficient blending of the different solutions.

Figure 5:
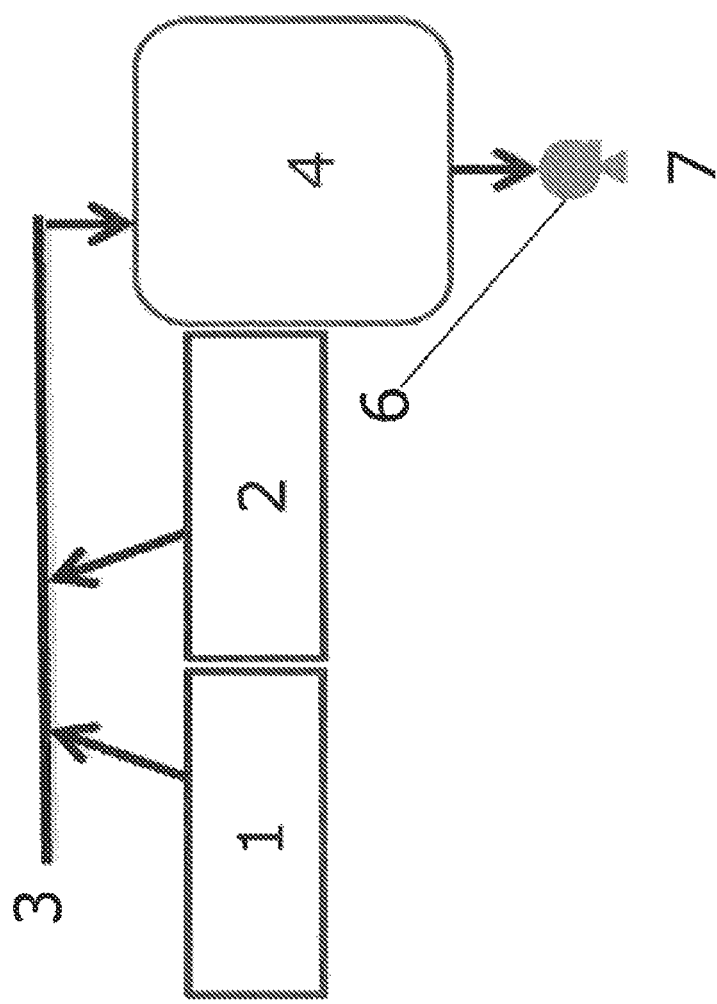
FIG. 5 is a drawing of a sequential addition method of producing dilute chloramine.

Referring now to FIG. 5 there is shown a method in which Feed items A and B (1, 2) are added sequentially to a stream of the diluent. The combination of Feed Items A and B (1, 2) result in the formation of the chloramine, which is then introduced into the wide space (4) along with the diluent. The setup may contain an optional in-line mixer to aid mixing of the chemical components and the diluent. Also, the setup may include a mixer in the tank to aid in efficient mixing of the different solutions.

Referring now to FIGS. 6-13 there are shown methods in which Feed Items A and B (1, 2) are synchronously or asynchronously combined in a diluted form (concentrate added to a diluent) via a controller device, such as a PLC device or a timer, or manually and the resulting chloramine is introduced, synchronously or asynchronously, into the process to be treated. In this method, any number of chemical components can be introduced into the diluent stream. The diluent can be water or any other liquid stream appropriate for the dilution of the chemical components. The method may comprise a valve (5) to control the flow. A solid arrow line after the valve (5), depicts a continuous flow while a dashed line represents an interrupted or discontinuous flow.

Figure 6:
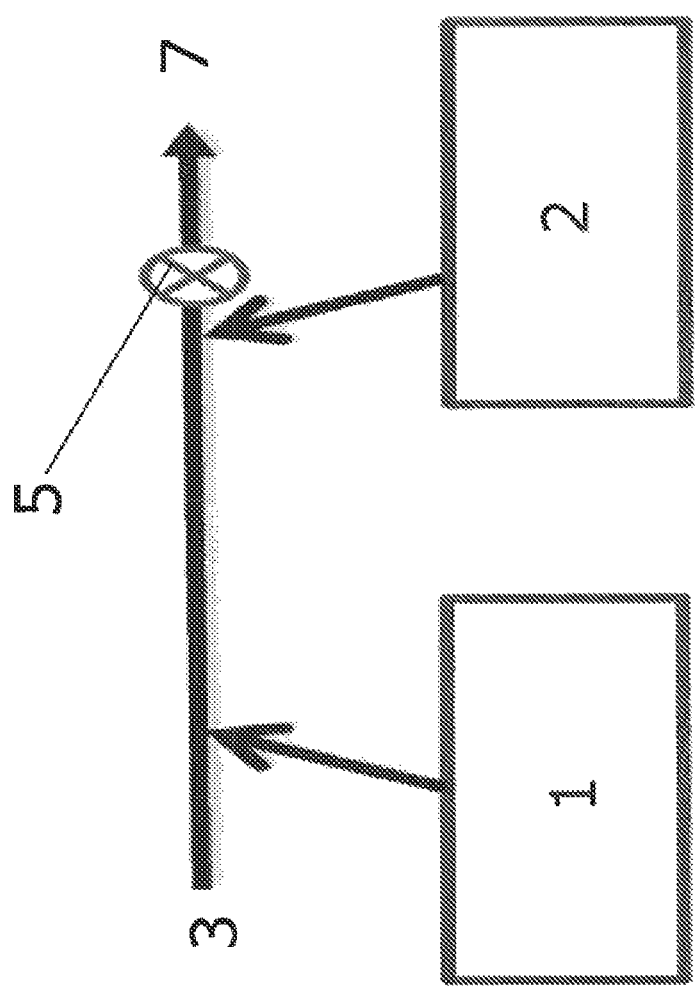
FIG. 6 is a drawing of a sequential feed method of introducing chloramine into a system to be treated.

Referring now to FIG. 6 there is shown a method in which Feed Items A and B (1, 2) are added sequentially into the conduit in a continuous manner and the feed of the resulting chloramine to the process being treated is continuous.

Figure 7:
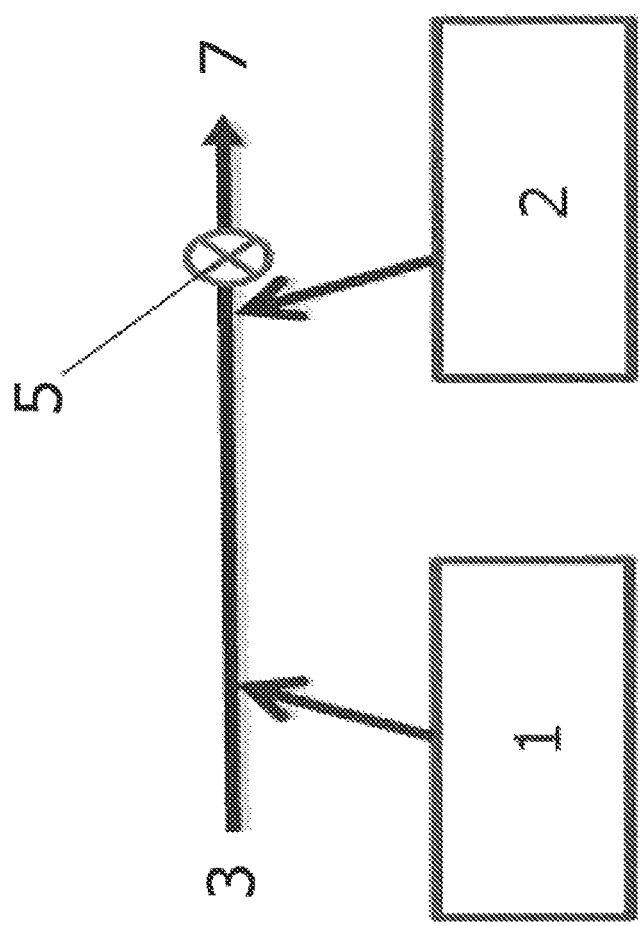
FIG. 7 is a drawing of a periodic addition method of introducing chloramine into a system to be treated.
Figure 8:
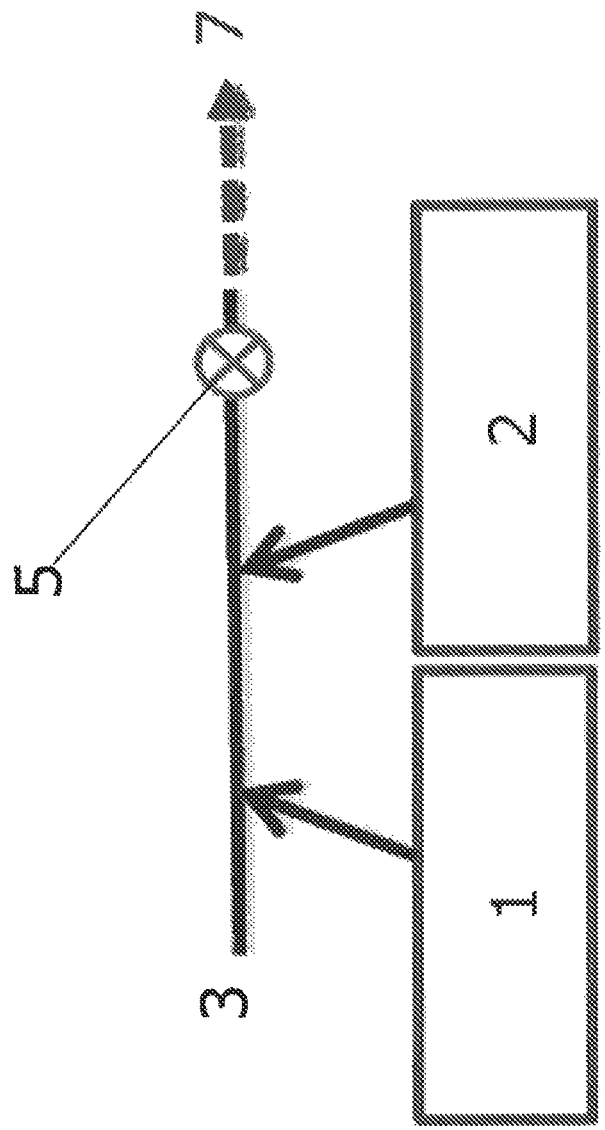
FIG. 8 is a drawing of a first form of alternating addition method of introducing chloramine into a system to be treated.
Figure 9:
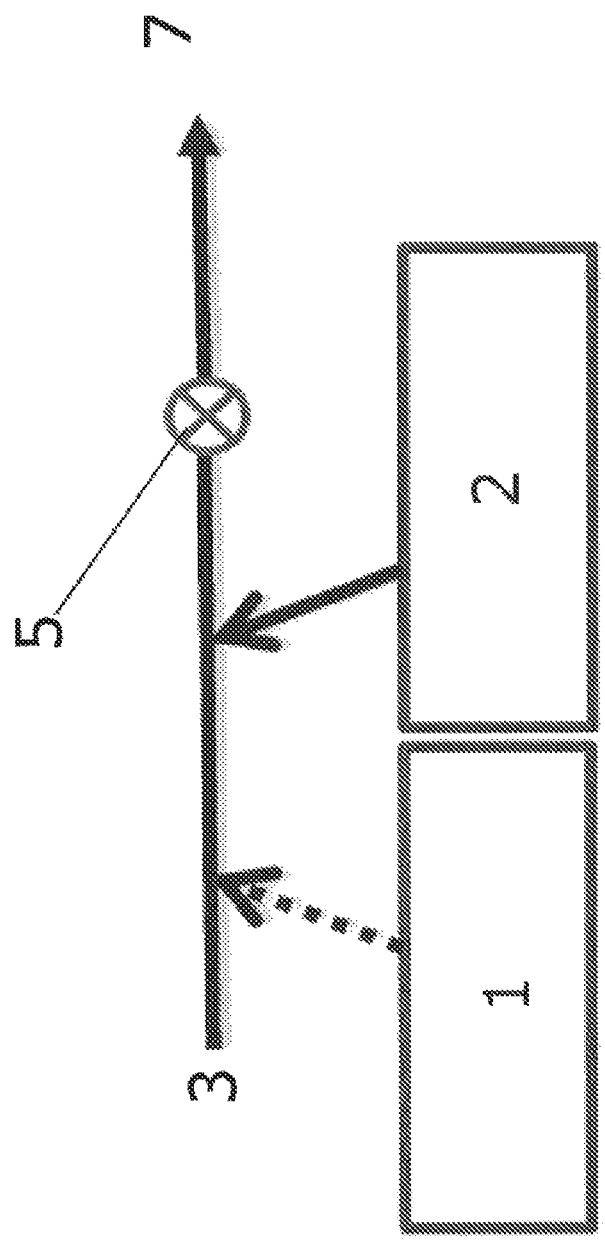
FIG. 9 is a drawing of a second form of alternating addition method of introducing chloramine into a system to be treated.
Figure 10:
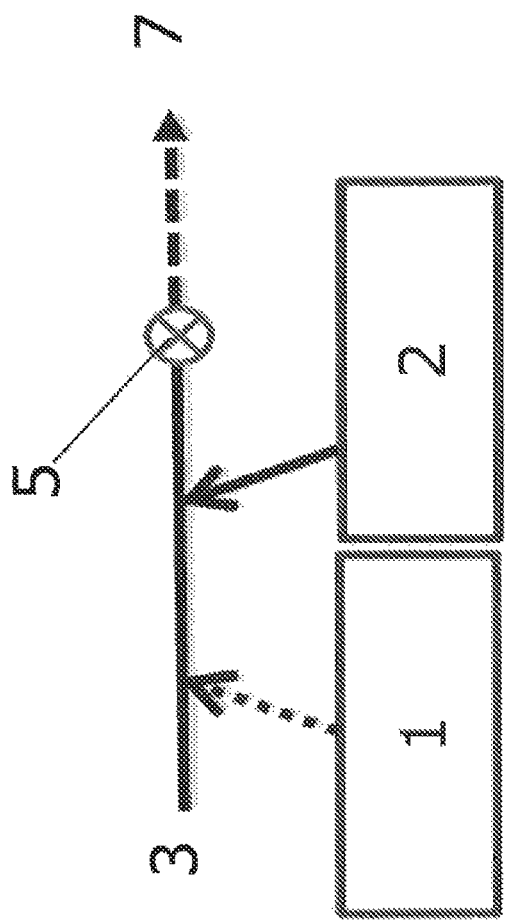
FIG. 10 is a drawing of a third form of alternating addition method of introducing chloramine into a system to be treated.
Figure 11:
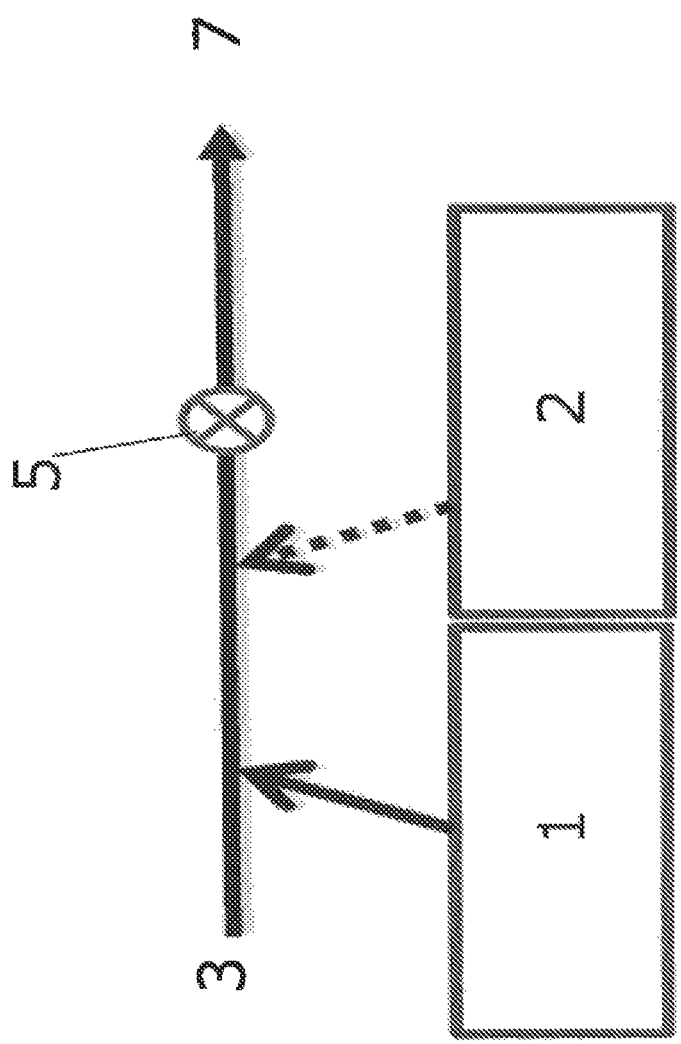
FIG. 11 is a drawing of a fourth form of alternating addition method of introducing chloramine into a system to be treated.

Referring now to FIG. 7 there is shown a method in which Feed Items A and B (1, 2) are added sequentially into the conduit in a continuous manner but the feed of the resulting chloramine to the process being treated is discontinuous.

Referring now to FIGS. 8, 9, 10, and 11 there are shown a method in which Feed Items A and B (1, 2) are added sequentially into the conduit but the addition of one of Feed Items A or B is periodic. The feed of the resulting chloramine to the process being treated can be either continuous or periodic.

Figure 12:
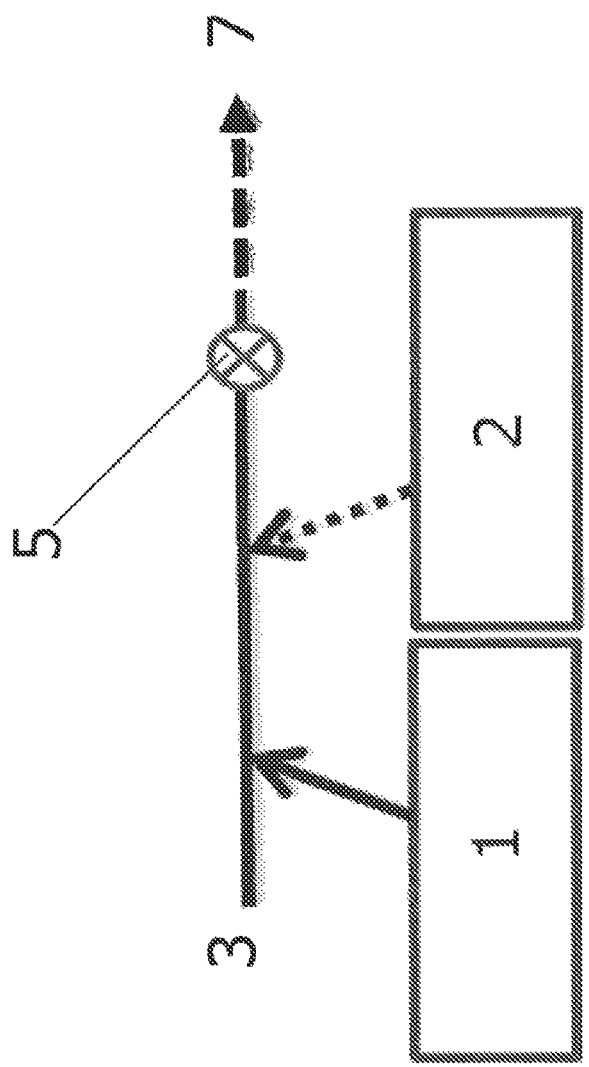
FIG. 12 is a drawing of a first form of alternating feeding addition method of introducing chloramine into a system to be treated.
Figure 13:
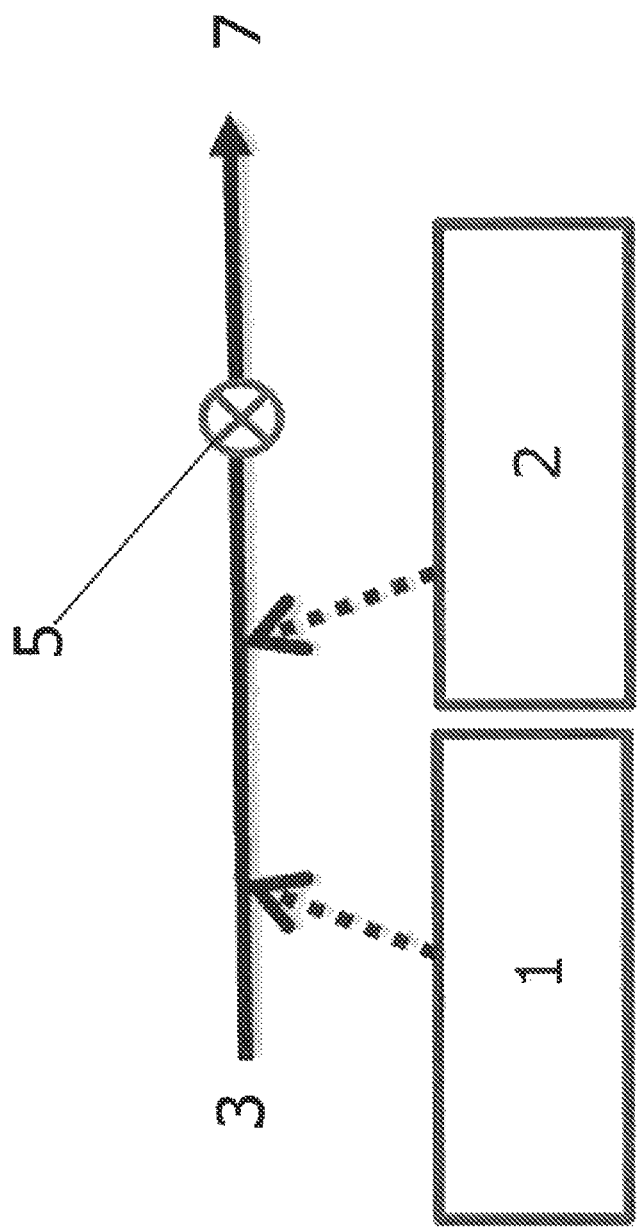
FIG. 13 is a drawing of a second form of alternating feeding addition method of introducing chloramine into a system to be treated.
Figure 14:
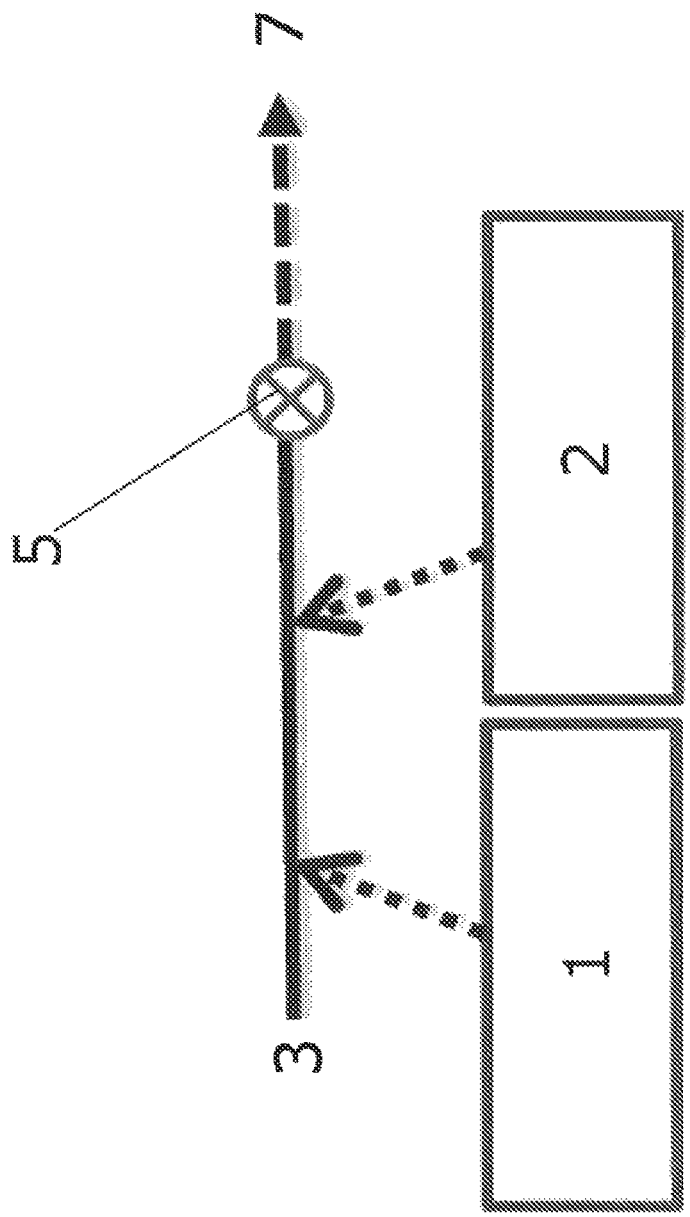
FIG. 14 is a drawing of a third form of alternating feeding addition method of introducing chloramine into a system to be treated.
Figure 15:
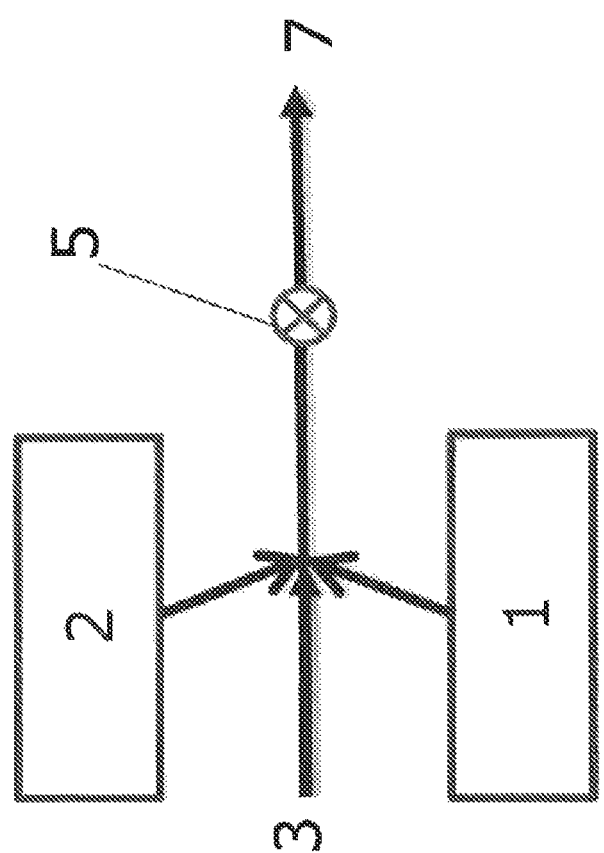
FIG. 15 is a drawing of a third form of alternating feeding addition method of introducing chloramine into a system to be treated where the amine and halogen components are added at the same location in the conduit.
Figure 16:
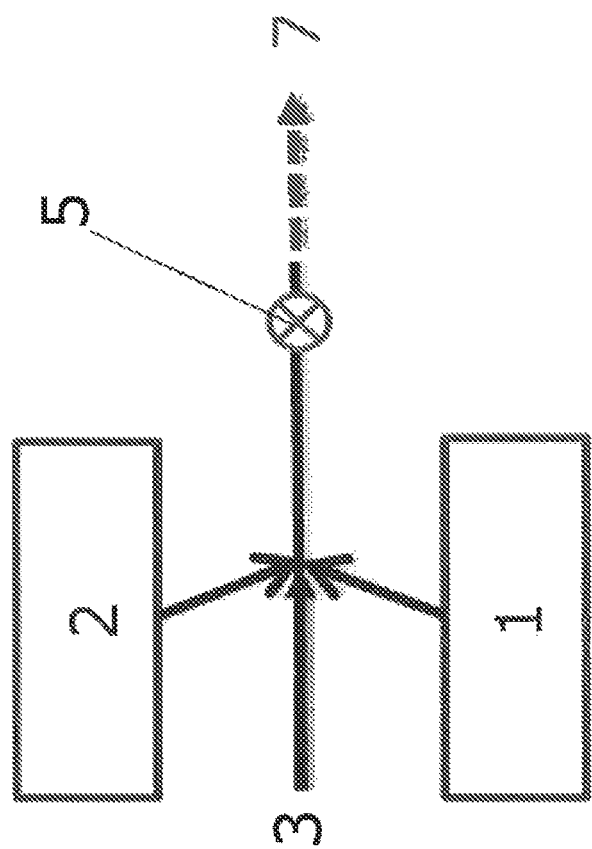
FIG. 16 is a drawing of a third form of alternating feeding addition method of introducing chloramine into a system to be treated where the amine and halogen components are added at the same location in the conduit.
Figure 17:
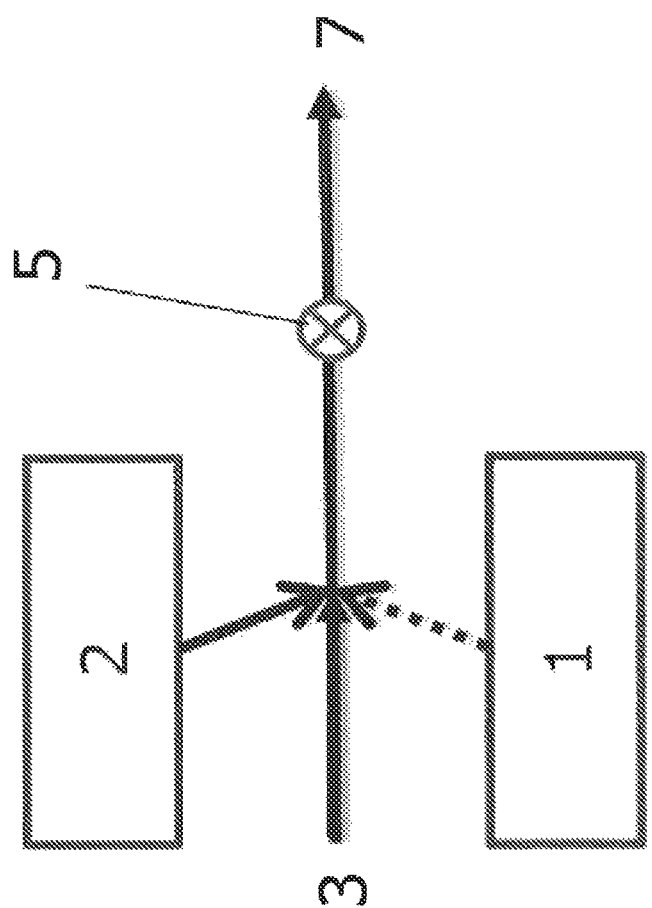
FIG. 17 is a drawing of a third form of alternating feeding addition method of introducing chloramine into a system to be treated where the amine and halogen components are added at the same location in the conduit.
Figure 18:
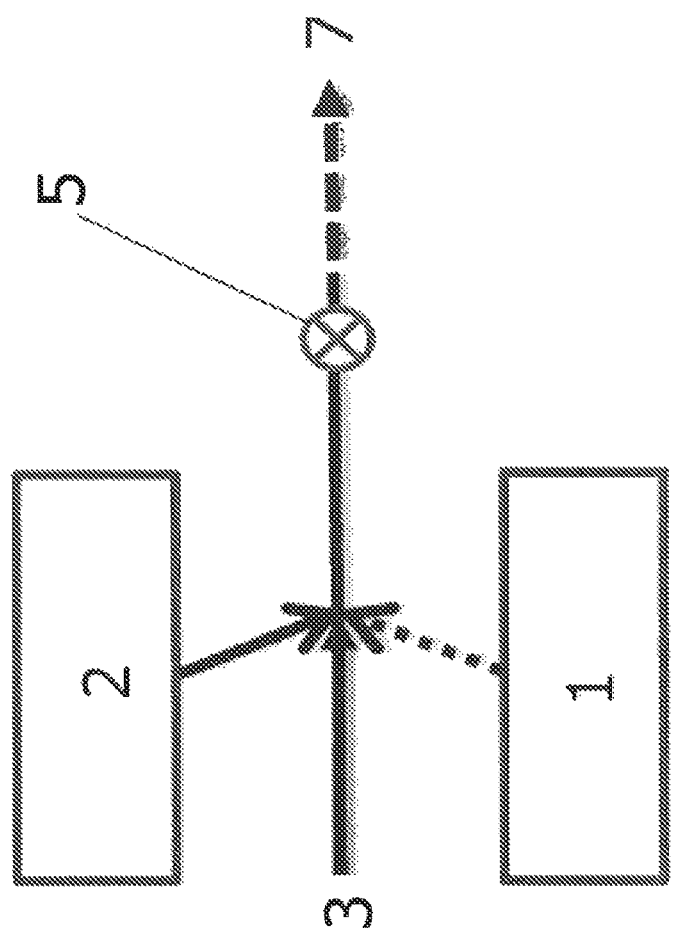
FIG. 18 is a drawing of a third form of alternating feeding addition method of introducing chloramine into a system to be treated where the amine and halogen components are added at the same location in the conduit.
Figure 19:
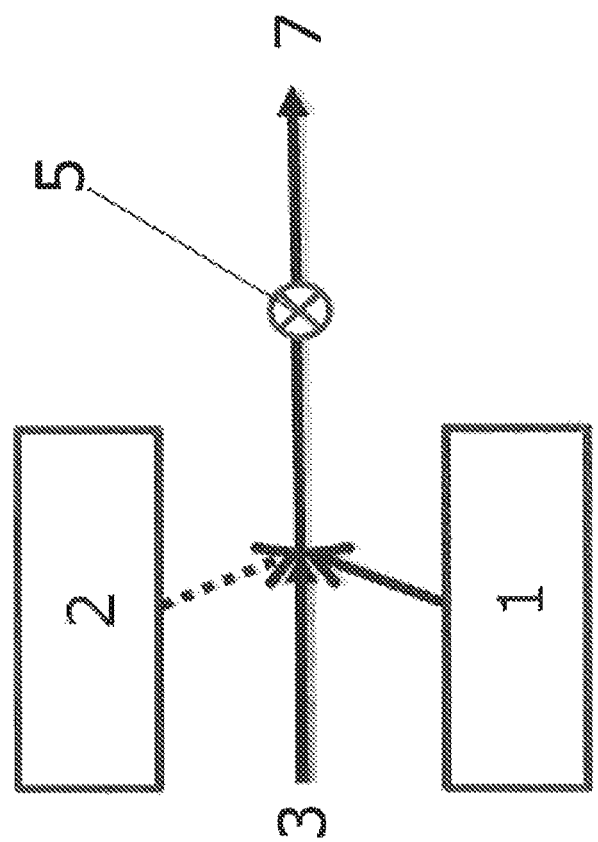
FIG. 19 is a drawing of a third form of alternating feeding addition method of introducing chloramine into a system to be treated where the amine and halogen components are added at the same location in the conduit.

Referring now to FIGS. 12 and 13 there are shown methods in which Feed Items A and B (1, 2.) are added sequentially into the conduit but the addition of all the chemical components is periodic. The feed of the resulting chloramine to the process being treated can be either continuous or periodic.

Referring now to FIGS. 14, 15, 16, 17, 18, and 19 there are shown methods in which Feed Items A and B (1, 2) are added simultaneously at the same location in the conduit and the addition of all the reactants can be continuous or periodic. The feed of the resulting chloramine to the process being treated can be either continuous or periodic.

The inventive methods facilitate the production of chloramine in ways that display numerous advantages. The method facilitates batch production and can be performed under dilute conditions. The ability to fine tune the amounts of chloramine, stabilizer, and halogen components allows for enhanced process compatibility and program performance through optimized chemical use. In at least one embodiment the production is coupled to a monitor device which measures quantity produced, and/or product quality.

As described earlier, the production of a halogenated amine disinfectant (for example chloramine) utilizes an amine source, an oxidizing halogenated compound and a diluent (preferably water) as chemical components. The concentration of the amine source in the concentrate form of the solution can range from 5%-80% and in the dilute form it can range from 0.01%-5%. Similarly, the concentration of the oxidizing halogenated composition in the concentrated form can range from 3%-18% and in the dilute form it can range from 0.01%-3%. From the perspective of blending ratio between the reactants, the molar ratio can range from 0.1:1 (N:Cl) to 10:1 (N:Cl). The ratio at which blending optimizes the formation of chloramine will determine the flow rates of the reactant in relation to time (invented method #1 above) or in relation to the flow rate of the diluent (invented method #2 above). The need for pH control at the time of blending may be achieved through the addition of other chemical components, for example caustic or an acid, or other means.

Among other reasons, this invention is superior to the prior art because it results in a form of stabilized-chlorine that has enhanced persistence of chlorine in fouled water systems thus providing for improved biofouling control.

The invention also moots the need for continuous operation of the chloramine feed system. Also, since the chloramine is produced in a dilute batch mode, the equipment required for production is simplified and the need for expensive, compatible materials is reduced. This also results in a safer system as there is no danger of a "runaway" reaction in controlled batch production that exits in continuous reactions. The controlled nature of the reaction also allows for precise dose changes in response instant changes in the reaction conditions.

The chloramine can be produced in a batch mode and then be dosed continuously or intermittently into the system being treated. This method also provides the ability to periodically deliver shock doses at much higher concentrations than would normally be applied and then allowing the chlorine residual to decay prior to subsequent treatment. Application of chloramine in such a shock dose regime provides for more persistent and widely distributed chlorine residual. Enhanced persistence of chlorine allows for better control over microbiological populations that may not be adequately controlled at lower chlorine doses or that may tend to develop as 'resistant' populations.

In at least one embodiment the chloramine is added according to an asynchronous mixing process. Unlike for example in U.S. Pat. Nos. 6,132,628 and 5,976,386 the asynchronous mixing of the reagents is more likely to result in the particular formulation ideal for killing the particular organism present happening to result and it also creates a dynamic environment which makes it difficult for organisms to adapt to. Such a moving target allows for a more thorough biocidal effect.

In at least one embodiment the asynchronous mixing process is a batch process. The reagents are made in discrete batches and are blended and added for a discrete period of time.

In at least one embodiment the asynchronous mixing process is a continuous process. The flow of reagents is not linked to a single blending. At any time there is an alternation of which reagents are fed. At some times all of the reagents are being fed and at other times some or none of the reagents are fed.

In at least one embodiment the flow of reagents is inhibited and does not pass directly from the conduit in which it is mixed into the system to be treated. Instead the reagent flow is stopped for a period of time in a tank or wide space for a period of time where at least some mixing occurs and only then do the reagents continue on to the system being treated.

In at least one embodiment, the chloramine is produced by the blending of an amine and chlorine (or bromine) source in a certain ratio. Chloramines provide for a more persistent chlorine residual in fouled water systems. Therefore, there are times when it would be beneficial to not dose chloramine but to dose only one of the two reactants (amine source or the chlorine compound). The need for such a strategy will vary from one application to another. For example, in conditions where there is the likelihood of low halogen consumption, a periodic addition of the amine source alone (no halogen) will aid quenching the free hypochlorous acid, formed or introduced, and thereby reduce corrosion. Minimizing free halogen also provides for improved compatibility with other chemicals that might be added to water systems, including but not limited to strength aids, retention or drainage aids, sizing chemicals, optical brightening agents, and dyes. Similarly, under conditions of high halogen demand, it would be prudent to periodically administer the oxidizing halogen alone (without amine) so that the halogen reduces some of the Chlorine demand and improves the long-term persistence of the chloramine and chlorine residual in the water system.

In at least one embodiment the process water system being treated for microbial control include but are not limited to cooling water systems, domestic water systems, boiler water systems, biofouling control or cleaning of RO membrane systems, in Food and Beverage applications such as flume water treatment, washing of fruits, salads and vegetables, treatment of waste water systems, ballast water systems, and paper, tissue, towel and board manufacturing processes, including machine chests, head box waters, broke chests, shower water etc.

In at least one embodiment the flow of at least one of the reagents is governed by a feeding mechanism. The feeding mechanism may be in informational communication with one or more forms of diagnostic equipment. The diagnostic equipment may measure and transmit the measurement of such variables as pH, temperature, amount of biological infestation, type of biological infestation, and concentrations of one or more compositions of matter. The measurement may be of any portion of the system to be treated and/or in any portion of the teed line(s). In at least one embodiment at least one of the forms of diagnostic equipment is at least one form of equipment described in U.S. Pat. No. 7,981,679. In at least one embodiment the feeding mechanism is constructed and arranged to increase, decrease, or cease the flow of at least one reagent in response to receiving at least one transmitted measurement.

In at least one embodiment the asynchronous flow of reagents is accomplished according to a "slug dose" strategy. In a slug dose the feeding alternates between low or non doses of one or more reagents and then concentrated feedings. For example over a 2.4 hour period extending between hour 0 and hour 24, at some point between hour zero and hour 6 nothing is fed into the system, then tee up to 6 hours bleach or ammonium sulfate is added, then for up to 6 hours both bleach and ammonium sulfate are added. In this regiment the concentration of free bleach free ammonium sulfate chlorine and formed chloramine varies. The slug dose can be targeted to be in synch with the expected growth and persistence of particular thrills of biological infestation. In at least one embodiment multiple slug doses can be fed per 24 hour period interspersed with periods of time in which nothing is fed to the system.

In at least one embodiment the asynchronous flow of reagents is accomplished according to a "continuous dose" strategy. In a continuous dose there is constantly some reagent being fed into the system but what and how much of each reagent changes. For example over a 24 hour period extending between hour 0 and hour 24, at some point between hour zero and hour 6 all of the reagents are fed into the system, then for up to 6 hours only bleach or only ammonium sulfate is added, then for up to 6 hours both bleach and ammonium sulfate are added. In this regiment the concentration of free bleach free ammonium sulfate chlorine and formed chloramine also varies. In addition the continuous dose can also be targeted to be in synch with the expected growth and persistence of particular forms of biological infestation. In at least one embodiment multiple doses of only bleach and/or only ammonium sulfate can be fed per 24 hour period interspersed with periods of time in which both are fed to the system.

While this invention may be embodied in many different forms, there described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Additionally, the invention also encompasses any possible combination of some or all of the various embodiments described and incorporated herein. Furthermore the invention also encompasses combinations in which one, some, or all but one of the various embodiments described and/or incorporated herein are excluded.

The above disclosure is intended to be illustrative and not exhaustive. This description will suggest many variations and alternatives to one of ordinary skill in this art. All these alternatives and variations are intended to be included within the scope of the claims where the term "comprising" means "including, hut not limited to". Those familiar with the art may recognize other equivalents to the specific embodiments described herein which equivalents are also intended to be encompassed by the claims.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 23 to 9.4, 3 to 8, 4 to 7), and finally to each number 1, 2, 3, 4, 5, 6, 7, 8, 9, and 10 contained within the range.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method of producing stable disinfectant for use as a biocidal composition in a process water system, the method comprising the steps of:
   providing items, the items consisting of:
   a) an amine source in concentrated form said concentrated form characterized as the amine source being within a diluent and the amine source comprises between 5% and 80% of the molar ratio of the combined diluent and amine source,
   b) an oxidizing halogen compound in concentrated form said concentrated form characterized as the halogen compound being within a diluent and the halogen compound comprises between 3% and 18% of the molar ratio of the combined diluent and halogen compound, and
   c) water;
   creating an amine-free flow of water through a first feed;
   asynchronously feeding the halogen compound in a concentrated form into the first feed line;
   when it is determined that a chlorine demand of the process water system is such that the oxidizing halogen compound alone will not operate as an effective biocidal composition because the water contains items that reduce the oxidizing halogen compound or render the oxidizing halogen compound inert, asynchronously feeding the amine source in a concentrated form via a halogen-free second feed line into a wide space such that the concentrated amine, concentrated halogen, and water come into contact and mix with each other in the wide space wherein the wide space is a tank constructed and arranged such that the wide space has a diameter larger than both the first and second feed lines and a transition from the first and second feed lines to the tank is not streamlined and thereby a flow from the first and second feed lines results in eddies which mixes the items so that for a time when the halogen is not fed into the tank there is still remaining halogen in the tank mixing with remaining amine whose reaction products are formed and fed into the process water system thereby creating a dynamic chlorine residual which is more widely distributed than if the tank were streamlined; and
   when it is determined that the halogen demand is low adding amine source and not adding halogen compound to the wide space thereby quenching free hypochlorous acid in the process water system, wherein a molar ratio of amine to oxidizing halogen is within a range of 7:1 to 10:1.

2. The method of claim 1 wherein the amine source is chloramine.

3. The method of claim 1 wherein the oxidizing halogen compound is a chlorine source.

4. The method of claim 1 wherein the oxidizing halogen compound is sodium hypochlorite.

5. The method of claim 1 wherein the flow is passed according to a batch process.

6. The method of claim 1 wherein the flow is passed according to a continuous dose process.

7. The method of claim 1 wherein the flow is passed according to a slug dose process.

8. The method of claim 1 wherein the process water system is one selected from the group consisting of: cooling water systems, domestic water systems, boiler water systems, biofouling control of reverse osmosis membrane systems, cleaning of reverse osmosis membrane systems, ballast water systems, and waste water treatment systems.

9. The method of claim 1 wherein the process water system is one component of a food and beverage process system selected from the group consisting of: flume water treatment, washing of fruits, washing of salads, and washing of vegetables.

10. The method of claim 1 wherein the process water system is a paper manufacturing system.

11. The method of claim 1 wherein the process water system is one component of a paper manufacturing system selected from the group consisting of: machine chests, head box waters, broke chests, and shower water.

* * * * *